US009813454B2

(12) United States Patent
Sadeh-Koniecpol et al.

(10) Patent No.: US 9,813,454 B2
(45) Date of Patent: *Nov. 7, 2017

(54) CYBERSECURITY TRAINING SYSTEM WITH AUTOMATED APPLICATION OF BRANDED CONTENT

(71) Applicant: Wombat Security Technologies, Inc., Pittsburgh, PA (US)

(72) Inventors: Norman Sadeh-Koniecpol, Pittsburgh, PA (US); Kurt Wescoe, Pittsburgh, PA (US); Joseph A. Ferrara, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,228

(22) Filed: Jun. 17, 2016

(65) Prior Publication Data
US 2016/0301716 A1   Oct. 13, 2016

Related U.S. Application Data

(63) Continuation of application No. 14/619,520, filed on Feb. 11, 2015, now Pat. No. 9,398,029.
(Continued)

(51) Int. Cl.
*G06F 21/55* (2013.01)
*G06F 21/56* (2013.01)
(Continued)

(52) U.S. Cl.
CPC ........ *H04L 63/20* (2013.01); *G06F 17/30864* (2013.01); *G06F 21/55* (2013.01);
(Continued)

(58) Field of Classification Search
CPC ............... H04L 63/145; H04L 63/1408; H04L 63/1416; H04L 63/1425; H04L 63/1433;
(Continued)

(56) References Cited

U.S. PATENT DOCUMENTS

| 6,324,647 | B1 | 11/2001 | Bowman-Amuah |
| 6,634,887 | B1 | 10/2003 | Heffernan, III et al. |

(Continued)

OTHER PUBLICATIONS

Kumaraguru et al., "Protecting People from Phishing: The Design and Evaluation of an Embedded Training Email System", 2007, In Proceedings of the SIGCHI Conference on Human Factors in Computing Systems.
(Continued)

*Primary Examiner* — Nikolai A Gishnock
(74) *Attorney, Agent, or Firm* — Fox Rothschild LLP (57) ABSTRACT

A cybersecurity training system uses lures and training actions to help train a user of an electronic device to recognize and act appropriately in situations that could compromise electronic device security. The system includes a library of cybersecurity training actions and a library of brand items. The system retrieves a template for a cybersecurity training action from the first library, automatically modifies the retrieved template to include a brand or branded content from the second library, and causes the cybersecurity training action according to the modified template instantiated with the branded content to be sent to the user's electronic device.

30 Claims, 7 Drawing Sheets

Related U.S. Application Data (60) Provisional application No. 62/031,956, filed on Aug. 1, 2014.

(51) Int. Cl.
  *H04L 29/06* (2006.01)
  *G06N 99/00* (2010.01)
  *G06F 17/30* (2006.01)

(52) U.S. Cl.
  CPC .......... *G06F 21/552* (2013.01); *G06F 21/554* (2013.01); *G06F 21/56* (2013.01); *G06F 21/562* (2013.01); *G06F 21/563* (2013.01); *G06F 21/564* (2013.01); *G06F 21/565* (2013.01); *G06F 21/566* (2013.01); *G06F 21/567* (2013.01); *G06N 99/005* (2013.01); *H04L 63/14* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/1475* (2013.01); *H04L 63/1483* (2013.01); *H04L 63/1491* (2013.01)

(58) Field of Classification Search
  CPC ............. H04L 63/1441; H04L 63/1458; H04L 63/1466; H04L 63/1475; H04L 63/1483; H04L 63/1491; G06F 21/55; G06F 21/56; G06F 21/552; G06F 21/554; G06F 21/562; G06F 21/563; G06F 21/564; G06F 21/565; G06F 21/566; G06F 21/567
  USPC .......................................... 726/11, 22, 23, 26
  See application file for complete search history.

(56) References Cited

U.S. PATENT DOCUMENTS

| | | |
|---|---|---|
| 6,954,858 B1 | 10/2005 | Welborn et al. |
| 7,092,861 B1 | 8/2006 | Shteyn |
| 7,325,252 B2 | 1/2008 | Bunker, V et al. |
| 7,457,823 B2 | 11/2008 | Shraim et al. |
| 7,486,666 B2 | 2/2009 | Meyer |
| 7,761,618 B2 | 7/2010 | Avraham et al. |
| 8,046,374 B1 | 10/2011 | Bromwich |
| 8,063,765 B2 | 11/2011 | Johnson et al. |
| 8,146,164 B2 | 3/2012 | Eshun et al. |
| 8,205,255 B2 | 6/2012 | Benea et al. |
| 8,220,047 B1 | 7/2012 | Soghoian et al. |
| 8,255,393 B1 | 8/2012 | Yu et al. |
| 8,266,320 B1 | 9/2012 | Bell et al. |
| 8,321,945 B2 | 11/2012 | Nakagawa |
| 8,341,691 B2 | 12/2012 | Bezilla et al. |
| 8,402,528 B1 | 3/2013 | McCorkendale et al. |
| 8,423,483 B2 | 4/2013 | Sadeh-Koniecpol et al. |
| 8,457,594 B2 | 6/2013 | Stevens et al. |
| 8,464,346 B2 | 6/2013 | Barai et al. |
| 8,468,244 B2 | 6/2013 | Redlich et al. |
| 8,468,279 B2 | 6/2013 | Khosravi et al. |
| 8,478,860 B2 | 7/2013 | Roberts et al. |
| 8,495,700 B2 | 7/2013 | Shahbazi |
| 8,532,970 B2 | 9/2013 | White et al. |
| 8,533,847 B2 | 9/2013 | Kedem |
| 8,560,709 B1 | 10/2013 | Shokhor et al. |
| 8,560,864 B2 | 10/2013 | Chang et al. |
| 8,561,134 B2 | 10/2013 | Bezilla et al. |
| 8,608,487 B2 | 12/2013 | Huie et al. |
| 8,615,807 B1 | 12/2013 | Higbee et al. |
| 8,635,703 B1 * | 1/2014 | Belani .................. H04L 63/1433 726/22 |
| 8,646,028 B2 | 2/2014 | McKenzie et al. |
| 8,656,095 B2 | 2/2014 | Coulter |
| 8,683,588 B2 | 3/2014 | Esteban et al. |
| 8,707,180 B2 | 4/2014 | Butler et al. |
| 8,719,925 B1 | 5/2014 | Berg |
| 8,719,940 B1 | 5/2014 | Higbee et al. |
| 8,751,629 B2 | 6/2014 | White et al. |
| 8,763,126 B2 | 6/2014 | Wang et al. |
| 8,769,684 B2 | 7/2014 | Stolfo et al. |
| 8,776,170 B2 | 7/2014 | Bezilla et al. |
| 8,782,745 B2 | 7/2014 | Stevens et al. |
| 8,793,795 B1 | 7/2014 | Ravid |
| 8,793,799 B2 | 7/2014 | Fritzson et al. |
| 8,819,825 B2 | 8/2014 | Keromytis et al. |
| 8,819,858 B2 | 8/2014 | Mandava |
| 8,910,287 B1 | 12/2014 | Belani et al. |
| 8,914,846 B2 | 12/2014 | Bezilla et al. |
| 8,918,872 B2 | 12/2014 | Kumar et al. |
| 8,931,101 B2 | 1/2015 | Baluda et al. |
| 8,943,554 B2 | 1/2015 | Tran et al. |
| 8,955,109 B1 | 2/2015 | Satish |
| 8,966,637 B2 * | 2/2015 | Belani .................. H04L 63/1433 726/25 |
| 8,978,151 B1 | 3/2015 | Chamberlain |
| 9,009,835 B2 | 4/2015 | Yoo |
| 9,015,789 B2 | 4/2015 | Thomas |
| 9,027,134 B2 * | 5/2015 | Foster ..................... G06F 21/60 726/22 |
| 9,031,536 B2 | 5/2015 | Fitzgerald et al. |
| 9,053,326 B2 | 6/2015 | Higbee et al. |
| 9,065,826 B2 * | 6/2015 | Colvin .................... G06F 21/53 |
| 9,069,961 B2 | 6/2015 | Khosravi et al. |
| 9,076,132 B2 | 7/2015 | Golan et al. |
| 9,118,665 B2 | 8/2015 | Krahn et al. |
| 9,118,702 B2 * | 8/2015 | MaCaulay ............ G06F 21/552 |
| 9,141,792 B2 | 9/2015 | Baluda et al. |
| 9,154,523 B2 | 10/2015 | Bezilla et al. |
| 9,215,250 B2 | 12/2015 | Porten et al. |
| 9,246,936 B1 * | 1/2016 | Belani .................. H04L 63/1433 |
| 9,253,207 B2 | 2/2016 | Higbee et al. |
| 9,262,629 B2 | 2/2016 | Belani et al. |
| 9,280,911 B2 | 3/2016 | Sadeh-Koniecpol et al. |
| 9,325,730 B2 | 4/2016 | Higbee et al. |
| 9,330,257 B2 | 5/2016 | Valencia et al. |
| 9,356,948 B2 | 5/2016 | Higbee et al. |
| 9,367,484 B2 | 6/2016 | Hogan et al. |
| 9,373,267 B2 | 6/2016 | Sadeh-Koniecpol et al. |
| 9,392,024 B2 | 7/2016 | Bezilla et al. |
| 9,398,029 B2 * | 7/2016 | Sadeh-Koniecpol ... H04L 63/14 |
| 9,398,038 B2 | 7/2016 | Higbee et al. |
| 9,426,179 B2 | 8/2016 | Keene et al. |
| 9,521,160 B2 * | 12/2016 | Ng ..................... H04L 63/1433 |
| 9,558,677 B2 * | 1/2017 | Sadeh-Koniecpol .... G09B 5/00 |
| 9,667,645 B1 * | 5/2017 | Belani .................. H04L 63/1433 |
| 9,674,212 B2 * | 6/2017 | Foster .................. H04L 63/1433 |
| 9,674,214 B2 * | 6/2017 | Foster .................. H04L 63/1441 |
| 2002/0091940 A1 | 7/2002 | Welborn et al. |
| 2004/0107345 A1 | 6/2004 | Brandt et al. |
| 2004/0123153 A1 | 6/2004 | Wright et al. |
| 2005/0183143 A1 | 8/2005 | Anderholm et al. |
| 2006/0037076 A1 | 2/2006 | Roy |
| 2006/0075024 A1 | 4/2006 | Zircher et al. |
| 2006/0224742 A1 | 10/2006 | Shahbazi |
| 2006/0253906 A1 | 11/2006 | Rubin et al. |
| 2007/0112714 A1 | 5/2007 | Fairweather |
| 2007/0180525 A1 | 8/2007 | Bagnall |
| 2007/0226796 A1 | 9/2007 | Gilbert et al. |
| 2007/0245422 A1 | 10/2007 | Hwang et al. |
| 2007/0271613 A1 | 11/2007 | Joyce |
| 2008/0052359 A1 | 2/2008 | Golan et al. |
| 2008/0070495 A1 | 3/2008 | Stricklen et al. |
| 2008/0167920 A1 | 7/2008 | Schmidt et al. |
| 2008/0222734 A1 | 9/2008 | Redlich et al. |
| 2008/0254419 A1 | 10/2008 | Cohen |
| 2008/0288330 A1 | 11/2008 | Hildebrand et al. |
| 2009/0144308 A1 | 6/2009 | Huie et al. |
| 2009/0158430 A1 | 6/2009 | Borders |
| 2009/0319906 A1 | 12/2009 | White et al. |
| 2009/0320137 A1 | 12/2009 | White et al. |
| 2010/0010968 A1 | 1/2010 | Redlich et al. |

(56) References Cited

U.S. PATENT DOCUMENTS

| | | |
|---|---|---|
| 2010/0146615 A1 | 6/2010 | Locasto et al. |
| 2010/0235918 A1 | 9/2010 | Mizrahi et al. |
| 2011/0167011 A1 | 7/2011 | Paltenghe et al. |
| 2011/0238855 A1 | 9/2011 | Korsunsky et al. |
| 2012/0124671 A1 | 5/2012 | Fritzson et al. |
| 2013/0198846 A1 | 8/2013 | Chapman |
| 2013/0203023 A1 | 8/2013 | Sadeh-Koniecpol et al. |
| 2013/0232576 A1 | 9/2013 | Karnikis et al. |
| 2014/0115706 A1 | 4/2014 | Silva et al. |
| 2014/0157405 A1 | 6/2014 | Joll et al. |
| 2014/0165207 A1 | 6/2014 | Engel et al. |
| 2014/0199663 A1 | 7/2014 | Sadeh-Koniecpol et al. |
| 2014/0199664 A1 | 7/2014 | Sadeh-Koniecpol et al. |
| 2014/0201836 A1 | 7/2014 | Amsler |
| 2014/0230060 A1 | 8/2014 | Higbee et al. |
| 2014/0230061 A1 | 8/2014 | Higbee et al. |
| 2016/0164898 A1 | 6/2016 | Belani et al. |

OTHER PUBLICATIONS

Kumaraguru et al., "Testing PhishGuru in the Real World", In Proceedings of the 2008 Symposium on Usable Privacy and Security (SOUPS 2008).

Kumaraguru, et al., "Lessons From a Real World Evaluation of Anti-Phishing Training", 2008 Anti-Phishing Working Group e-Crime Researchers Summit.

Sheng, et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.

Mitrovic, et al., "Evaluation of a Constraint-Based Tutor for a Database Language", International Journal of Artificial Intelligence in Education (1999), 10, 238-256.

Anderson et al., "A Development System for Model-Tracing Tutors", Nov. 18, 2008, Department of Psychology, Paper 78, Carnegie Mellon University Research Showcase.

Fette et al., "Learning to Detect Phishing Emails", World Wide Web Conference Committee, May 8-12, 2007, Banff, Alberta, Canada.

NIST, Risk Management Framework (RMF) Overview, [online], [Retrieved on Aug. 5, 2015], published Apr. 3, 2013, Retrieved from the internet, http://web.archive.org/web/20130304154402/http://csrc.nist.gov/groups/SMA/fisma/framwork.html, entire document, especially p. 1 and p. 2.

International Search Report and Written Opinion from Application No. PCT/US2015/15860 dated Jun. 16, 2015.

Jagaric et al., "Social Phishing" ACM (Dec. 12, 2005).

The web page http://threatsim.com/how-it-works, as published Jan. 15, 2012.

"How PhishMe Works", captured from web.archive.org based on page at www.phishme.com published Dec. 4, 2011.

Scheeres, Thesis: "Establishing the Human Firewall: Reducing an Individual's Vulnerability to Social Engineering," presented to Air Force Institute of Technology, Mar. 2008.

Vishwanath et al., "Why Do People Get Phished? Testing Individual Differences in Phishing Vulnerability with an Integrated, Information Processing Model." Mar. 3, 2011.

Ferguson, "Fostering E-Mail Security Awareness: The West Point Caronnade," published in Educause Quarterly Nov. 1, 2005.

Information about Related Patents and Patent Applications, see section 6 of the accompanying Information Disclosure Statement Letter, which concerns Related Patents and Patent Applications.

* cited by examiner

CYBERSECURITY TRAINING SYSTEM WITH AUTOMATED APPLICATION OF BRANDED CONTENT

RELATED APPLICATIONS AND CLAIM OF PRIORITY

This patent document claims priority to, and is a continuation of, U.S. patent application Ser. No. 14/619,520, filed Feb. 11, 2015, titled "Cybersecurity Training System with Automated Application of Branded Content," which claims priority to provisional patent application No. 62/031,956, filed Aug. 1, 2014, entitled "Automated Cybersecurity Training System with Branded Training Messages." The disclosures of the priority applications are fully incorporated into this document by reference.

BACKGROUND

Breaches of data security are serious matters for businesses around the world. A single data breach can result in significant expenses for the company experiencing a breach. For example, in 2013 the Ponemon Institute conducted a study which found that the average cost of a data breach incident to United States businesses was $5.4 million. When intangible costs such as loss of consumer trust and bad publicity are added, it is clear that businesses have a financial incentive to improve their data security.

Corporate data breaches commonly occur due to carelessness of corporate employees. Employees may fall for phishing emails or text messages, access websites hosting malware, or fall for other lures that lead them to disclose sensitive data or compromise computer systems. Similarly, individuals and households, or users of non-corporate systems such as university students, can be subject to data breaches. Even responsible users can unwittingly be lured by a phishing attack. IBM recently cited in their 2014 Security Services Cyber Security Intelligence Index that over 95 percent of all security incidents investigated recognize "human error" as a contributing factor.

Accordingly, businesses seek better ways of mitigating data breaches, and especially solutions that can help prevent data breaches.

This document describes methods and systems that address at least some of the issues described above, or additional issues.

SUMMARY

In an embodiment, a cybersecurity training system includes a processor and one or more data storage device portions that store programming instructions, a library of brand items (i.e., candidate brands and/or branded content), and a library of training actions such as cybersecurity lures. Each lure includes a prompt that, if responded to by a user of an electronic device, will trigger the system to direct a cybersecurity training action to the user. The programming instructions are configured to cause the system to implement a policy manager system that generates a query to the library of cybersecurity training actions; retrieves a template for a cybersecurity training action from the library in response to the query, selects a brand item that is available for use in the template from the library of brand items, automatically modifies the template to include a brand or branded content that corresponds to the selected brand item, and causes the template for the cybersecurity training action according to the modified template to be sent to a second electronic device The system may cause an electronic device to output an administrator interface that presents selectable options, such as training campaign actions, categories of training campaign actions, users, and/or historical training data for one or more users. When the system receives a selection from an administrator via the administrator interface, then in response the system queries the library of cybersecurity training interventions, retrieves at least one of the training interventions from the library of cybersecurity training interventions, and presents each retrieved lure to the administrator via the administrator interface. The training interventions will also present, to the administrator via the administrator interface, at least one available brand item for each of the retrieved lures. When the system receives a selection of one of the available brand items, it will select a first one of the retrieved lures and automatically modify the retrieved training intervention to include branded content that corresponds to the selected brand item. The system will then cause the selected training intervention with the branded content to be sent to a trainee—user of an electronic device.

DETAILED DESCRIPTION

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. As used in this document, the term "comprising" means "including, but not limited to." The word "plurality" is intended to mean "more than one."

For the purposes of this document, the terms "electronic device" and "computing device" interchangeably refer to a device or system of one or more devices that includes at least one processor and non-transitory, computer-readable memory. The memory may contain programming instructions that, when executed by the processor, cause the device to perform one or more operations according to the programming instructions. Examples of computing devices include personal computers, gaming systems, televisions, wearable electronic devices (such as smart watches), implantable electronic devices, and portable electronic devices such as smartphones, personal digital assistants, cameras, tablet computers, laptop computers, global positioning service (GPS) navigation devices, media players and the like. Where appropriate for the context, the term "electronic device" also may refer to a software application configured to operate on an electronic device, or firmware that is installed in an electronic device. In some embodiments, specialized electronic devices other than general purpose computing devices may be used. Examples include a smartphones having transceiver that may generate and receive messages via wireless communications capability; a computing device having a wireless network transceiver that can connect to and exchange communications with other devices via a wireless network access device; a GPS navigation device; a media player; a wearable electronic device such as a smart watch or smart eyewear having a processor, display and user interface; and the like.

When used in this document, unless specifically stated otherwise the term "processor" component of one or more electronic devices can refer to a single processor or to multiple processors that together implement various steps of a process. Similarly, unless specifically stated otherwise, a "memory device," "data storage device" or "database" can refer to a single device or databases or multiple devices or databases or portions thereof across which programming instructions and/or data are distributed.

An "administrator" is a person or system who is authorized to initiate and/or modify lures and/or training interventions in a cybersecurity training campaign.

A "brand" means a trademark, service mark, product or service name, logo, corporate name, organization name (including government and non-profit organizations) or other identifier of a product (whether offered or proposed), service (whether offered or proposed), or organization (whether a corporation, non-profit entity or other organization that offers goods or services to others).

"Branded content" means textual content, multimedia content, addresses (e.g., URL, email address, alphanumeric telephone number) or any other type of content or identifier that refers to a brand, whether by directly including a brand name, referring to commonly recognized attributes of a brand (e.g., a URL or logo), or variations of the above that are intended to be reminiscent of the brand (e.g., microsoft-.com or Microsoftware instead of microsoft.com or Microsoft) or a larger set of content to be sent or otherwise presented to a user, wherein the content includes a brand in a context and/or format such that the content appears as if it originated from the owner of the brand or from one who acted under authority of the owner of the brand. Branded content may be used in lures, training content, and/or other messages as described in more detail below.

A "brand item" means a brand or branded content.

A "lure" means an item that may be acted upon by a user of an electronic device, such that if the user uses the electronic device or another electronic device to perform a particular action in response to receiving the lure (such as using a touch screen, mouse or other user interface of the electronic device to click a hyperlink in a mock phishing email to connect to a mock malicious WiFi access point, or more generally, to act upon information or a prompt conveyed with the help of the electronic device itself or with the help of some other electronic device), the electronic device, or data available through the electronic device or some other device or system, or other hardware with which the device interacts could be exposed to a cybersecurity threat. A lure may also be an item that simulates a cybersecurity threat to the device, or to data accessible through the device or some other device, system, or organization where the cybersecurity threat, if it were real, would materialize if the user failed to perform an expected action on the electronic device in response to receiving the lure (such as a user failing to use an interface of the device to cause a telephone or messaging application available on the device to notify a system administrator about the lure within a specified period of time after receiving the lure). Examples of lures include: (i) electronic messages (e.g., emails, SMS, MMS, instant messages, in-channel message delivered by a service such as a social networking site, a message delivered using some other messaging technology) containing a prompt intended to lure the user to click a mock malicious hyperlink, open a mock malicious attachment, call a mock malicious number, or disclose sensitive information; (ii) a post on a social media site to which the user subscribes, wherein the post contains a prompt such as those described above; (iii) a telephone call (optionally automatically placed with prompts that interact with the user through an automated menu or some automated dialogue functionality such as Interactive Voice Recognition technology, multi-modal interactive technology, voice over Internet protocol (VOIP) technology, automated speech recognition technology, some other automated dialogue functionality) prompting the user to disclose sensitive information or perform a risky action (iv) a memory device (such as a universal serial bus storage device) containing an executable file with mock malware that will activate if the memory device is inserted into the user's electronic device and/or the executable file is opened by the user; (v) a barcode (such as a quick-response QR Code® or other matrix code) that, when scanned by an electronic device having scanning and decoding capability, causes the device to be directed to a mock malicious website or service, or to initiate the download of mock malware (e.g., a mock malicious software app) on the user's electronic device; (vi) a short-range communication device such as a near field communication (NFC) or radio frequency identification (RFID) tags containing instructions that, when read by a mobile electronic device, causes the device to be directed to a mock malicious website or service, or to initiate the download of mock malware; (vii) a piece of mock malware that is downloadable from a file transfer site or other website or from a software application service; or (viii) the deployment of a wireless communication service such as a mock malicious Wi-Fi access point intended to lure the user to connect to it with his electronic device.

A "positive cybersecurity communication" means a message that includes content that notifies a user or an administrator that the user has exercised good cybersecurity practices.

A "training intervention" means a message or action designed to improve a user's cybersecurity awareness and result in the elimination of or reduction in the likelihood that the user engages in activities or behaviors that create a cybersecurity risk. Training interventions can come in many formats including, but not limited to, an interactive software training module, a training video, training game or other multimedia training content delivered through one or more output devices. Training interventions may also come in the form of assignments to be completed by a specified deadline. Training interventions can be initiated in multiple ways, including, but not limited to, user actions, administrator actions, and system defined actions.

A "training action" means a lure, a training intervention, a positive reinforcing message directed to a user, or some other action that contributes to the assessment of users and/or their training. Training actions, whether lures, training intervention, positive reinforcing messages or other types of training actions may come in the form of templates that can be customized. For instance, a "change your password" phishing email lure may come in the form of a template that can be customized with parameters such as the brand and logo of a particular organization.

This document describes a method and system for computer based cybersecurity training, optionally using lures. Prior methods of providing cybersecurity training are disclosed in U.S. Patent Application Pub. Nos. 2012/0258437 and 2013/0203023, as well as U.S. patent application Ser. Nos. 14/215,981 and 14/216,002, each filed by Sadeh-Koniecpol et al., and each of which is fully incorporated herein by reference. In the current method, the system includes or causes an electronic device to output an administrator interface that allows an administrator to manage a cybersecurity training campaign that uses branded messages.

Figure 1:
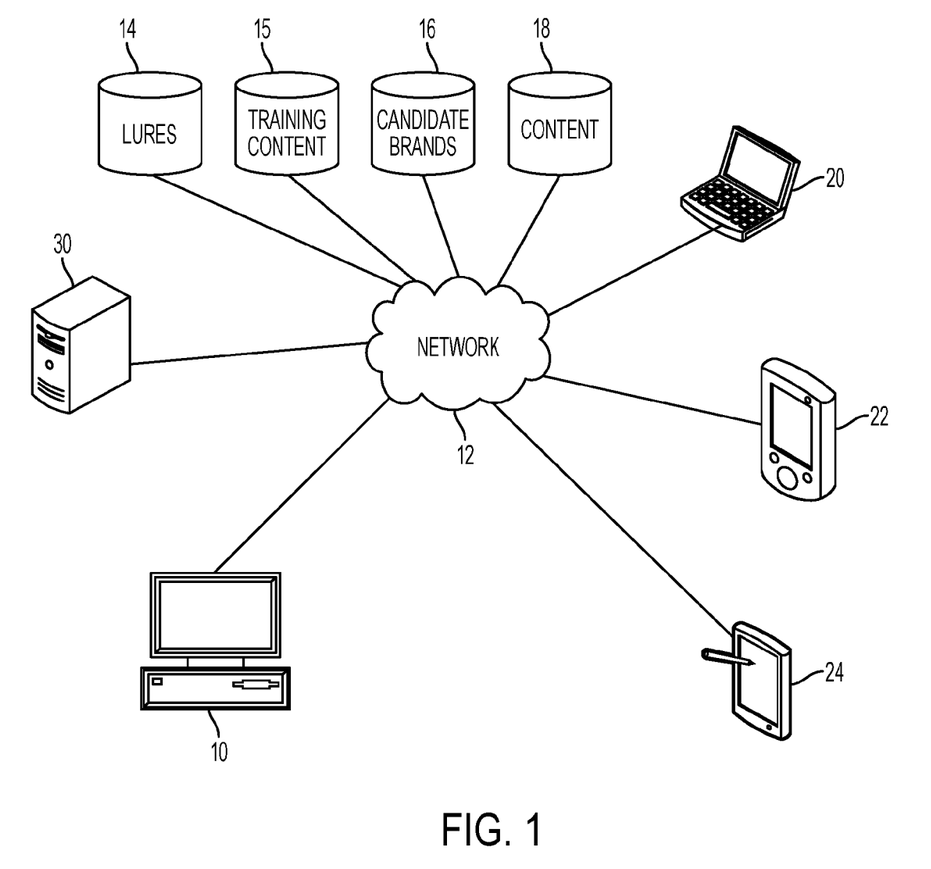
FIG. 1 is a block diagram illustrating various elements of an embodiment of a cybersecurity training system.

FIG. 1 illustrates certain basic elements of a cybersecurity training system. An administrator has access to an administrator console 10, sometimes referred to in this document as administrator interface, which is a user interface or an electronic device with a user interface that enables the administrator to view, and in some cases select and/or modify, lures, training interventions and other communications in a cybersecurity training campaign. The administrator console 10 may be generated by the execution of software on the administrator's local electronic device. Alternatively, the administrator console may be served by a cloud-based or local system of one or more servers through a network 12, and viewed on the administrator's device via a browser or other software application.

The system includes one or more data stores that hold a library of lures 14, a library of training content 15 for use in training interventions, and libraries of information about various candidate brands 16 and content 18. The content may be branded messages, or message templates that can optionally be customized with brand items. Any or all of these data stores and libraries may be merged, maintained separately, maintained locally on the administrator's computing device, or maintained remotely and served to the administrator by a cloud-based service or a collection of one or more servers. Each of these data stores may include meta-data. For instance, lure meta-data may include the types of devices on which the lure can be delivered, the types of users for which the lure is appropriate, estimates of the effectiveness of the lure (e.g., likelihood that someone falls for it), etc. Meta-data about brands may include the particular formats in which brand items are available (e.g., logo, URL, name of the company, name of products), whether and when consent was obtained to use the brand material in the training system, including constraints on the context within which the brand material can be used (e.g. consent is only for use with customers of a particular brand, or subject to explicit user opt-in, or only with users 18 and older), when the consent expires, etc. Meta-data about training content may again include information about the format in which the training content is available (e.g., HTML, PDF, wmv), the types of devices on which it can be delivered, including possibly parameters such as minimum screen size or requirements for speakers, the language in which it is available, the time it takes to be delivered (e.g., a 1 minute pop-up message versus a 5-minute interactive training module), its effectiveness, etc. The meta-data for any content item, lures, training content, or candidate brands may include information that can be used to constrain the type of content items, lures, training content or candidate brands with which it can be combined. For example, a particular lure may be related to a particular training content item, or to a particular message. For instance a lure in the form of a phishing email template prompting users to click a link may be related to a training intervention template warning users to use a mouse, touch screen or other electronic device of a user interface to hover over the link (or otherwise highlight the link) and inspect its URL prior to clicking (i.e., actuating the link so that a browser accesses the URL contained in the link). Both templates may refer to a brand parameter, which has to assume the same value when the two templates are used together so that when a brand is selected, the brand parameter in the lure template and the one in the training intervention template are instantiated with the same selected brand.

The system may include a policy manager 30 made up of one or more servers or other processors that serve as a hub for various elements of the system. The policy manager 30 will contain and implement programming instructions to interface with the administrator and one or more users 20, 22, 24 of various electronic devices. The policy manager may include or implement programming instructions that causes it to select users to whom lures will be sent or who otherwise are to be trained, lures to be used to train users, brands to be included in the lures, training interventions to be sent to users, and brands to be used in these training interventions. Each of these decisions can either be fully automated, driven by manual decisions made by the system administrator, or a combination. In a hybrid mode, the policy manager may recommend one or more possible decisions and the system administrator may choose from these options. The policy manager also may include or implement programming instructions that causes it to execute the training campaign, which includes delivering lures to users to be trained, monitoring user response or lack thereof, and delivering follow-up training interventions.

Figure 2:
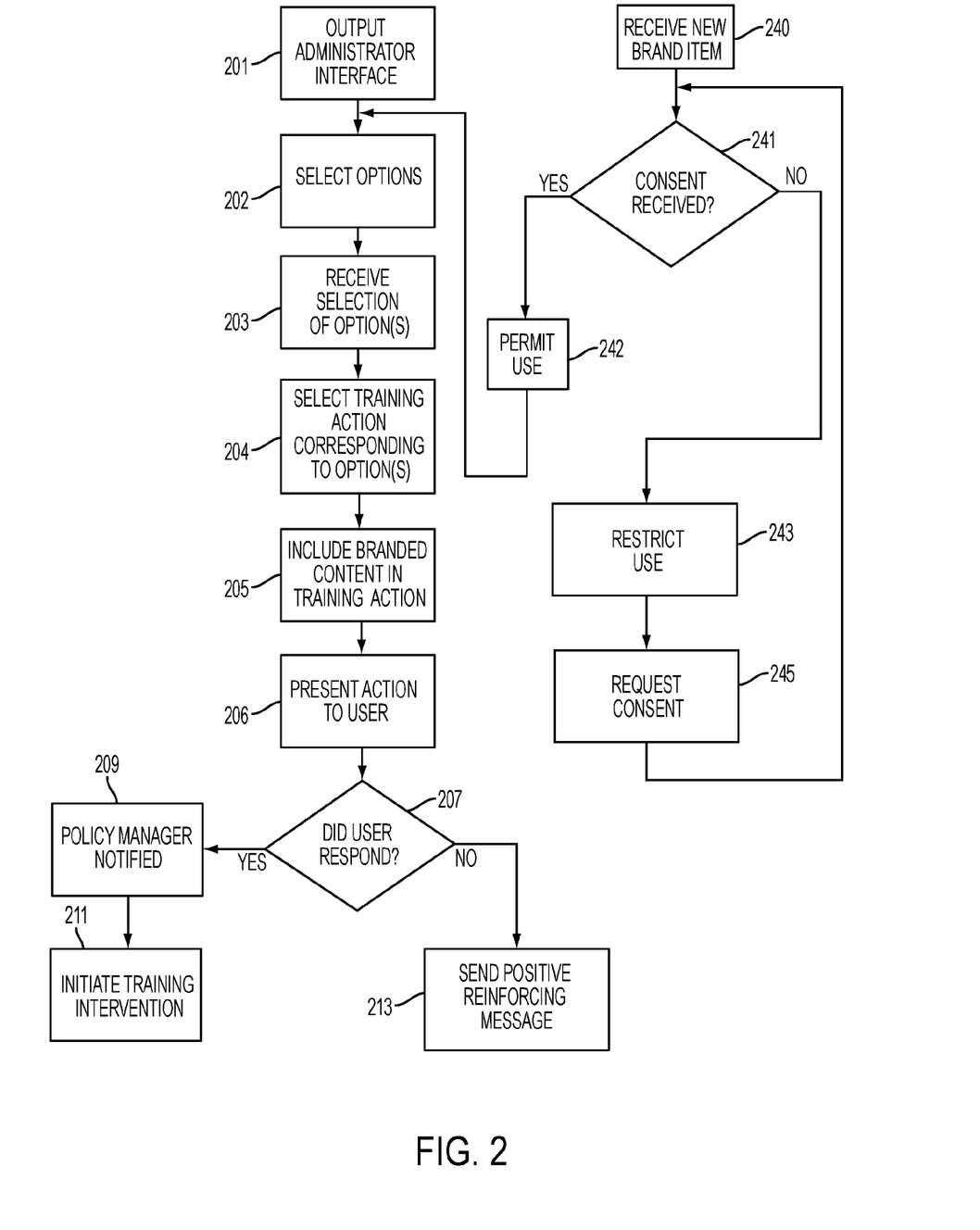
FIG. 2 is a flow diagram illustrating certain steps of a process that a cybersecurity training system may implement.

The system described in this document may enable an administrator to trigger, or may allow the system to sense, user activity to determine whether a user of an electronic device is susceptible to engage in behavior that exposes devices or data used or controlled by him or others, or by his organization, to a cybersecurity threat. FIG. 2 is a basic diagram illustrating a process that the system may follow to accomplish this. In some embodiments, the system causes an electronic device to output an administrator interface 201. The system selects one or more options for selection by an administrator and displays the options via the interface 202. These options may include available training actions (lures, training interventions, and the like), categories of training actions, users, or historic training data for one or more users. Options available from which the administrator may select may also include available brand items (e.g., brands and branded content for which appropriate consent may have been secured). When an administrator selects one or more options via the interface, the system receives the option(s) 203 and selects a lure 204 (or other training action(s)) that corresponds to the selected option(s). The selection may be automated by the policy manager based on any suitable rules. For example, if the administrator selects a particular training action, the system simply selects the training action that the administrator selected. However, if the option is a category of training actions, the system may select a particular training action in the selected category; if the administrator's selection is in the form of one or more users to be trained, then the system may access profile data about the one or more selected users and select one or more training actions that are deemed a good match based on the profile data associated with the one or more selected users (e.g., selecting a "new employee" training action for a group of employees who recently joined the organization); or if the selection was based on historic user data then the system may select a training action that is a good match for the selected historic user data (e.g., selecting a training action focused on training a group of users to safely handle USBs because these users all recently infected their laptops with malware on USBs they received at a conference). Selection of available brands and brand items may be done by the administrator or by the system, or a combination of both. Selection by the system or the administrator from available brands and brand items may include a number of consideration such as profile data available for users selected to be trained, as further discussed below. A human administrator may also use the policy manager (and the administrator interface) to select training action(s) and/or other options based on recommendations or options presented by the policy manager.

The system may then customize the lure or other training action to include branded content 205 that is associated with the selected brand item(s). In some embodiments this may be done by selecting a lure that is pre-populated with branded content. Alternatively, the system may retrieve or may have been given a branded content template and may customize it with the brand name or other content that is associated with selected brand item(s). Other examples of how an administrative user may select, or the system's policy manager may select and implement, branded content will be described below. Fully instantiated training actions such as training actions that have been customized to include selected branded content are eventually presented to one or more selected users 206, whether right away or at some later time, using any means discussed in this document such as email that includes the branded content, an SMS message with the branded content, implementation of a rogue wi-fi access point with the brand name, a mock malicious mobile app with the brand name, and the like.

If the training action was a lure, then based on the user's response (or lack of a response), the policy manager may select and deliver a training intervention to the user. For example, the policy manager may wait for the user to respond to the lure 207 by taking an action in response to the prompt (e.g., downloading a mock malicious mobile app, connecting to a mock malicious WiFi access point, falling for a mock phishing message). If the user does not fall for the lure within a threshold period of time (or some other meaningful set of constraints), then the system may send the administrator, the user, or both a positive cybersecurity communication 213, which is a message indicating that the user appears to have exercised safe cybersecurity practices by not responding to the lure. If the user does fall for the lure by taking the action that the prompt encouraged the user to take, the policy manager will receive a notification 209 of the user's action and will initiate a training intervention 211 for the user. A training intervention can take many different forms, such as an interactive software training module, a training video, training games or other multimedia training content delivered through one or more output devices available to communicate with the user. It may be delivered in one or more installments. Training interventions may be provided as soon as a particular event is sensed (e.g., a just-in-time training intervention) or may be provided for later delivery to a user, such as the assignment of a software training module or a training activity that has to be completed by a certain date. A training intervention may include multiple iterations such as taking an interactive training module until one reaches a certain level of proficiency. Various training interventions are described in the prior art patent applications filed by Sadeh-Koniecpol et al., listed above, and examples are also discussed below.

As noted above, in some embodiments, when a user takes the bait by responding to a lure's prompt 207, the policy manager will be notified of the action 209. This may happen in any number of ways. For example, the prompt in a mock phishing message may direct the user to actuate a hyperlink and that, when actuated, causes a browser or other application of the user's electronic device to access a particular URL. A sensor used by the system that serves the content located at that URL may then inform the policy manager that the user fell for the lure and visited the URL. Alternatively, that information may be recorded in a separate system, which the policy manager may check on a regular or semi-regular basis to review and analyze the one or more lures a user has fallen for and decide what training interventions to select for that user, if any. In other words, the policy manager may directly receive information from one or more sensors that detect relevant activities of the user or may access sensed information recorded in one or more systems. Activity sensors to determine what lures a user may or may not have fallen for may include systems that access social networking sites, blog or microblog feeds, or other public or semi-public communications by the user. They may include sensors hosted at different URLs to determine whether the user visited particular sites or clicked particular links (e.g., mock malicious mobile app store URL). They may include hardware and/or software that senses whether a user connects to a particular network (e.g. mock malicious WiFi network), email-based sensors to determine whether a user has responded to a particular email, computer vision sensors to detect whether a user has carried out a particular activity, file-based sensor to determine whether a user has opened a particular file (e.g. email attachment or file hosted on a memory device such as a USB), speech recognition sensors to determine how the user responds to a mock malicious phone call (e.g. automated phone call). Some of the sensing may take place directly on the user's electronic device, while other types of sensing may also involve other electronic devices. For example, a user's electronic device may include a processor and programming instructions that processes, analyzes and identifies actions taken by the user that are indicative of whether the user has fallen for a particular lure. Other sensors may include hardware (e.g. antennas, processors) and software configured to discover available wi-fi networks or nearby short-range or near-filed communication-enabled networks or devices and detect which network or device the user attempts to connect to. Someone versed in the art will appreciate that many other types of sensors can be used to determine whether a user falls for different types of lures.

Optionally, a "user action" that triggers recording, notification or intervention may be that the user failed to take an action within a threshold period of time (or within some other meaningful set of constraints such as while being at a given location). For example, instead of a "lure," the system may send the user a legitimate prompt to change his or her password. If the user fails to change his or her password (or take some other legitimately required action) within the threshold period of time, then the policy manager may be notified or more generally the lack of action may be recorded for future possible analysis by the policy manager, potentially leading to the policy manager eventually selecting an appropriate training intervention for that user.

Just as the system may customize the lure to include branded content, the system also may use a brand item within a training intervention 211 or a positive reinforcing message 213. Methods for doing this will also be described below.

Optionally, when the system detects a response to a lure, it may determine whether the response originated from a known user. A known user is a user for which the system has an entry stored in a data set of known users. Examples of attributes associated with such entries include a username, email address, phone number, assigned electronic device identifier, or the like If the response did not originate from a known user (e.g. in some embodiments, the system may only be allowed to record information about known users and deliver training interventions to these users) the system may not deliver a training intervention to the user, but instead may optionally deliver a different message, take a different action, or take no action at all.

Figure 3:
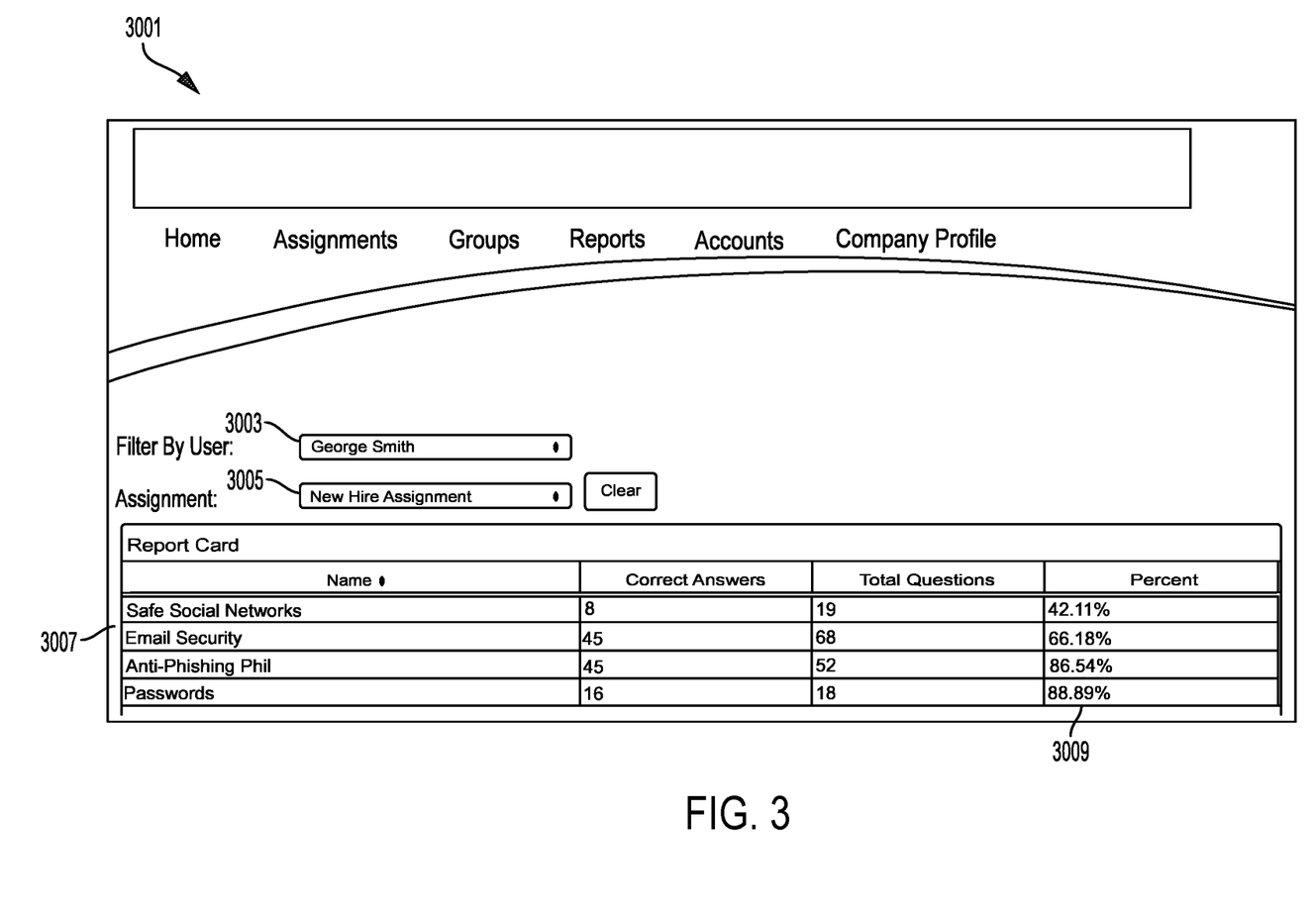
FIGS. 3-5 illustrate example screens of an administrator interface.

FIG. 3 depicts an embodiment of a screen of a system administrator interface 3001 that displays examples of sensed historical training data collected about a user 3003 (identified as "George Smith"). In this example, user Smith was recently assigned a collection of training modules referred to as the "New Hire Assignment" 3005. The historical training data in this particular case shows that the user was assigned four training modules (safe social networks, email security, anti-phishing, and passwords) 3007 and has provided responses to the questions or other prompts included in the assigned training modules. The interface displays a summary of the type of historical training data collected by the platform, including in this case training relating to the threat scenarios of social network usage, email security, anti-phishing and password security. The interface displays a representation of an estimate of the user's likelihood of being at risk for a threat scenario 3009. In this case, the estimate is a percentage of correct answers provided by the user while taking the training provided by a collection of the interactive training modules. It could also include responses to different mock attacks and other relevant risk and training needs factors.

Figure 4:
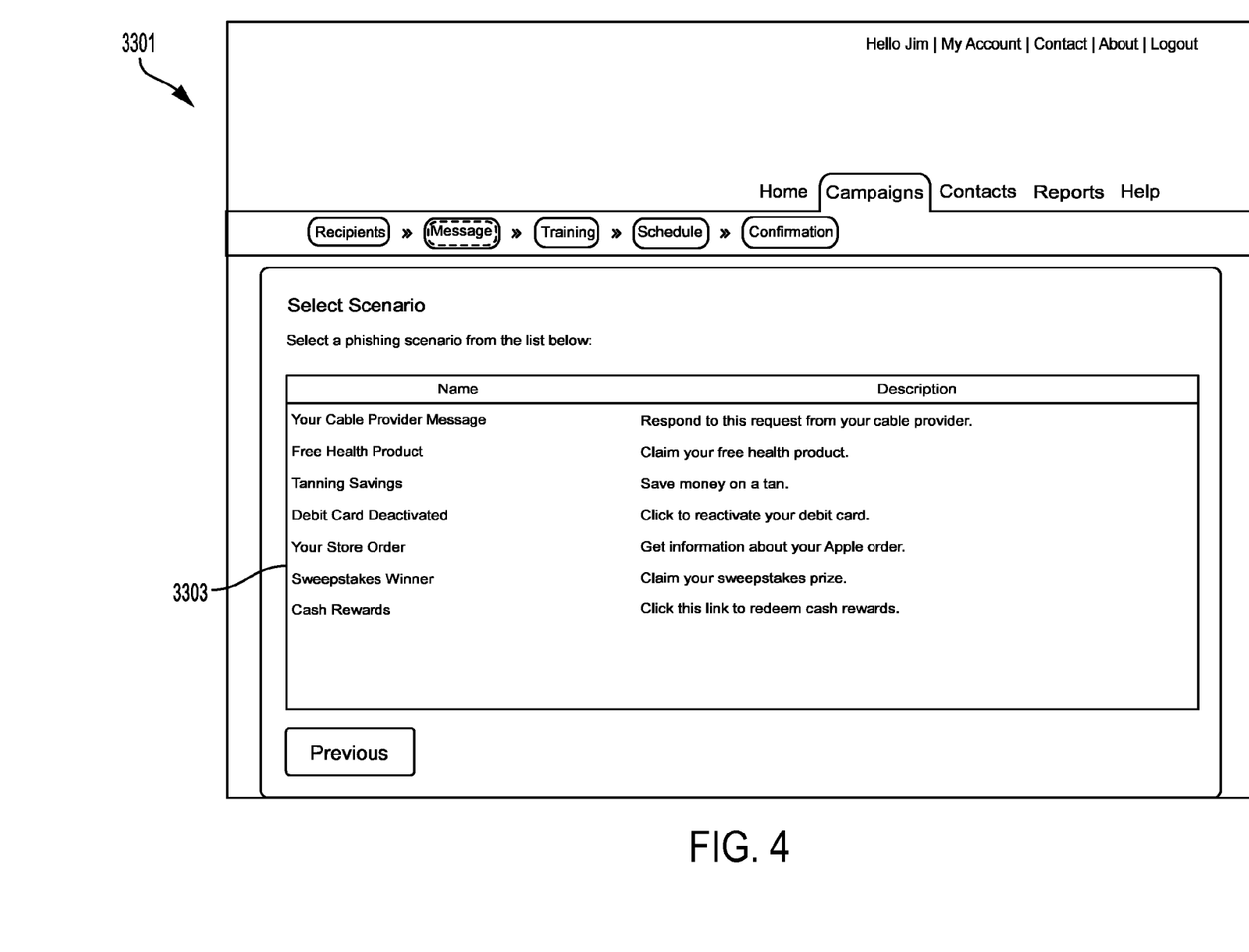
Figure 5:
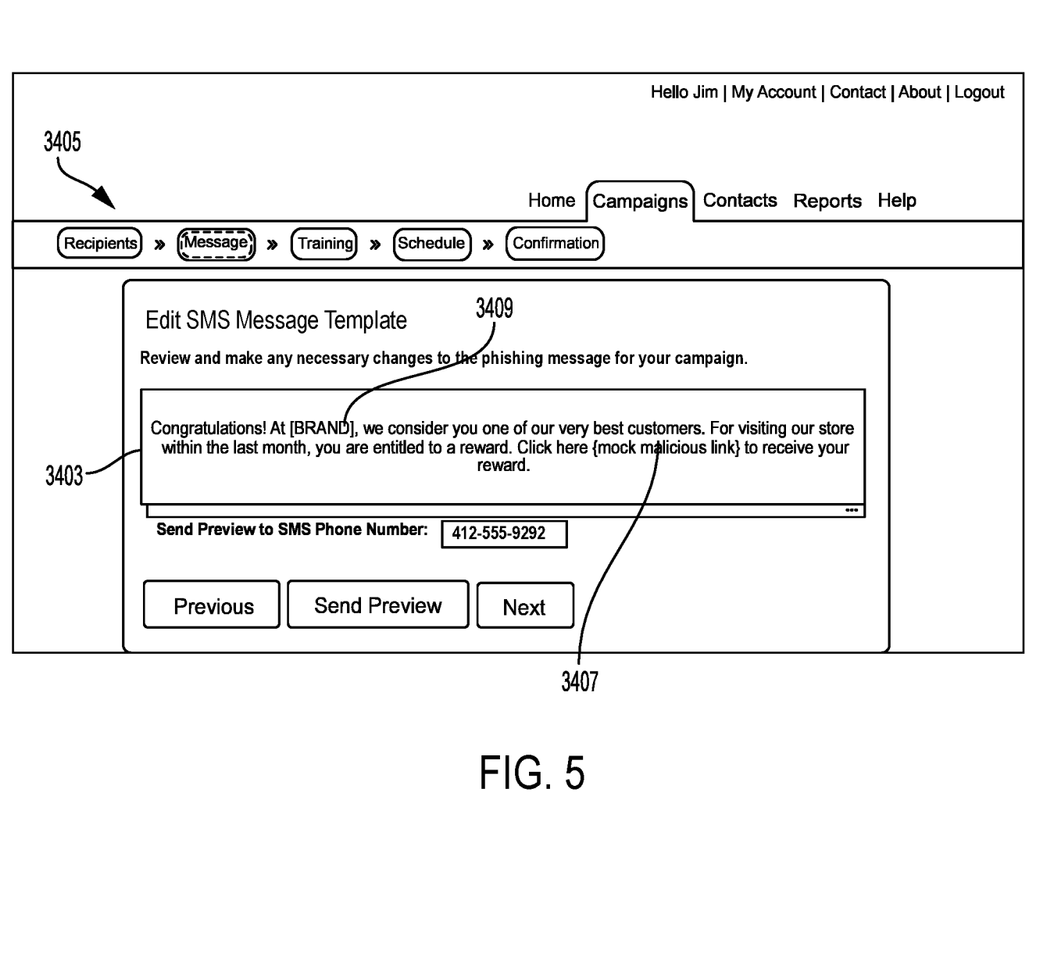

FIG. 4 illustrates a screen 3301 of the administrator console in which the system may select lures (including lure templates) to be presented to a user or group of users. For example, for the "new hire assignment" discussed above, the administrator may use the interface to select or review various available lures (which may include lure templates) 3303 to assign to the user as part of that assignment. Some lures may be assigned automatically by the system's policy manager, while others may be selected by a human system administrator via the user interface. Or, the lures may be selected by a combination of the two, such as by having the system recommend a set of lures (which may include lure templates) by displaying the recommended lures and giving the administrator the opportunity to review, modify/customize and select one or more of them. Selection and customization of lures may be based on any suitable rules or criteria, including information obtained from user profile or other data available such as training history or behavior data (which may include information about another mock attack the user fell for). When the system or administrator assigns lures, or more generally training actions, it may also select and assign start dates and/or times, end dates and/or times, or reminder options. The system may permit an administrator to customize a lure by permitting the administrator to choose from various available options and parameters, including available brand items, or simply modify and/or edit different parts of the lure (e.g., text of a mock phishing email template used as a lure). These options will be discussed in more detail below. FIG. 5 illustrates an example of an interface 3403 via which an administrator can customize elements of a lure in the form of a mock SMS phishing message. This includes instantiating template parameters by querying relevant sources of information (e.g., first names of targeted users, list of brands available for the given template, lists of brands that are available taking into account both the lure template and profile information about targeted users, etc.). This interface also may be used to allow the administrator to preview or further modify the lure. The interface also displays a workflow 3405 that the system may follow when walking the administrator through lure customization. Mock malicious link field 3407 is an example of a template parameter that can be instantiated with one or more available fake malicious links, possibly in the form of available branded items that include branded fake malicious links. Similarly, brand field 3409 is an example of a template parameter that can be manually selected by the administrator from a list of available brands.

Returning to FIG. 2, in various embodiments, when the system receives a request to add or modify a brand, or add or modify branded content, to any of its brand item libraries that include such content 240, the system may determine whether the system has received consent for use of the new brand item in the cybersecurity training process from the owner of the brand 241. The owner may be a corporate owner of a trademark, its authorized representative, or some other entity who is not affiliated with the system and who has authority to provide consent to use the brand and branded content in cybersecurity training. If the system does not have such consent, it may or may not add the brand item to the library, but in either case it will not mark the brand item as available for use in a cybersecurity training action if consent is not received 243. The system may do this in any suitable manner, such as by attaching meta-data to the brand or branded content, or by using some other way of keeping track of this information. If the system does have consent, it may permit the brand item to be used in cybersecurity training 242. If consent is not available, the system may automatically request consent from the brand's owner 245. Methods for automatically requesting such consent are described in more detail below in the discussion of FIG. 6. In general consent for using a branded item in training content (e.g. in training actions) may come along with any number of restrictions. This includes restrictions in time (e.g., granting consent for a given period of time or until a given date), geographical restrictions (e.g., restrictions on the countries for which consent has been granted), user profile restrictions (e.g., restrictions on the age of users who receive training content customized with the branded item), relationship restrictions (e.g., restrictions that limit use to employees of a given organization or to customers of a given organization). Consent restrictions may be recorded using meta-data or by any other method suitable for keeping track of this type of information.

Although the embodiments of FIGS. 4 and 5 illustrate customization of lures, in some embodiments the system's interface also may be used in the same manner to customize positive reinforcing messages or training interventions with branded content.

Figure 6:
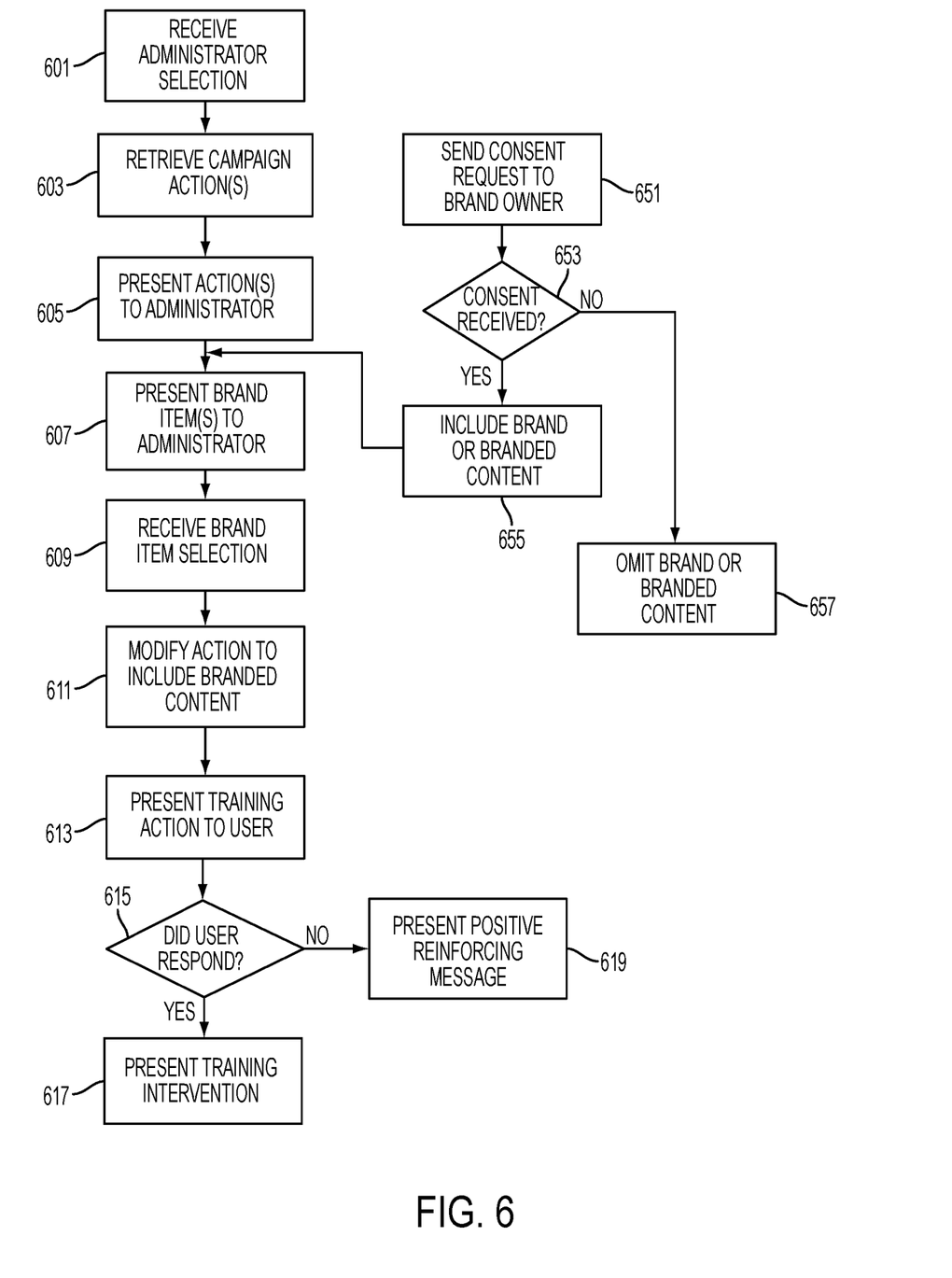
FIG. 6 is a flow diagram illustrating certain steps of a method of adding branded content to a lure or training intervention message.

FIG. 6 is a flow diagram illustrating examples of various actions that a cybersecurity training system may take to customize lures, training actions and other communication with branded content. The system may include one or more data storage devices that store instructions for a library of cybersecurity lures, wherein each lure includes a prompt that, if responded to by a user of an electronic device, will trigger the system to direct a cybersecurity training action to the user. The system also may include a policy manager that includes a non-transitory memory holding programming instructions that, when executed, instruct a processor to implement the process. When the system receives a selection from an administrator via an administrator interface 601, then in response it may retrieve at least one of the training campaign actions from the data store 603 and present each retrieved training campaign action to the administrator via the administrator interface 605. Depending on the part of the campaign that is being developed, the retrieved training campaign actions may be lures, training interventions, positive reinforcement messages, or any combination of these. The selection and retrieval of training campaign actions may be done by the administrator, by the policy manager based on one or more rules, or a combination of the two. The selection 601 may be of a specific type of action, or it may be of a category, such as a category of mock attacks. If the selection is a category, then, when selecting and presenting the training campaign actions, the system may use only campaign actions that correspond to that category. Someone skilled in the art will appreciate that the particular sequence discussed above and illustrated in FIG. 6 is just one of a number of possible embodiments of processes that allow and administrator to customize training actions, lures and positive cybersecurity communications with branded content, subject to proper consent being secured for using the branded content.

After a training campaign action is selected, the system may present, to the administrator via the administrator interface available brand items 607. If the selection 601 was of a category of mock attacks (e.g., mock phishing emails, mock malicious WiFi access point, mock malicious mobile app), then when selecting and presenting the campaign actions the system may use only brands or branded items available for the selected category of mock attacks (e.g., only a subset of brands or branded items may have consent to be used in the context of a fake phishing email). In addition or alternatively, the system may access profile data for the user and use the profile data to identify, from a library of candidate brands, a brand with which the user is likely to interact (e.g., if three different brands are available for use in a mock phishing email, the system may for each user decide which of these three brands is a best match for the user based on user profile data). The system may determine this in any suitable way. For example, the system may analyze the profile data to determine whether the user has actually interacted with a given brand in the past, or the system may use demographic information (e.g., age of the user, gender) as well as other considerations (e.g., role of the user in the organization, hobbies or interests, country where the user lives, language spoken by the user, etc.) to determine whether the user has likely interacted with a brand or is likely to interact with or be interested in a brand. Interaction may be via a purchase of a good or service that is associated with a brand (e.g., being a subscriber of a particular telecom operator) or accessing a website associated with a brand (e.g., banking online at a particular site).

The system may then present the identified brand item to the administrator. The system may receive a selection of one of the available brand items 609 and modify one or more of the retrieved campaign actions to include branded content that corresponds to the selected brand item 611. Optionally, the administrator interface may restrict the administrator from modifying the branded content that will be included within the training action but may permit the administrator to modify other content of the training action. Optionally, the system may also enable an administrator to enter new brand or brand item for which content has not yet been secured, optionally triggering a process to obtain consent for use of the brand item by the brand owner, as described above and below.

Optionally, when customizing one of the retrieved training actions with a selected brand item, the system may access a library of content to be used in branded messages, where the content may be associated with a brand type and/or a type of training action. The system or the administrator, or a combination of the two, may then query and select, from the library, branded content having an associated brand type that corresponds to the selected brand and an associated campaign action type that corresponds to the selected action.

Optionally, when receiving a selection of one of the available brand items, the system may access a library of candidate brands, each of which may be associated with one or more brand categories (or more generally brand attributes). The system may select, from the library, one of the candidate brands using one or more of the following criteria: (1) a requirement that the selected brand correspond to a category that is also associated with the user; (2) a requirement that the selected brand have branded content that is compatible with a category of the campaign action; or (3) a requirement that all lures, training interventions, and/or other messages initiated by that particular administrator include content compatible with the selected brand.

The system will then cause the customized training action (such as a lure customized with any selected branded content) to be delivered to the user, whether via the user's electronic device 613 or with the help of any other electronic device available to present the lure to the user. If the training action was a lure and the system receives an indication that the user responded to the lure 615, it may automatically generate a training intervention that corresponds to the lure so that the training intervention. The training intervention also may be appropriately customized with any selected branded content, and the system may cause the training intervention to be presented to the user 617. In some embodiments of this process, the training intervention may already have been generated ahead of time and customized to include any selected branded content, prior to the launch of the training campaign, whereas in other embodiments this part of the process may take place after the system senses that the user has fallen for a lure and/or requires training. If the system does not receive an indicator that the user responded to the lure within a threshold period of time 615, the system may automatically generate a positive reinforcing message that may be customized to include any selected branded content, and it may cause the positive reinforcing message to be presented to the user 619. Other variations of the above embodiments are possible, including different ways of deciding whether to customize training actions such as training interventions and positive cybersecurity communications with selected brands and branded items, when to do so, and how.

Any or all of the steps listed above also may be used to generate a training message with branded content. For example, the system may develop a positive cybersecurity communication or a training intervention with branded content, and the process described above may be used for such development. This may allow the owner of the brand to customize the training message to remind and assure the user that the brand owner would not take actions to compromise security, such as with a message stating "we will never ask for your account number and password in an email."

Prior to or during the steps described above, the system may automatically manage a library of brands and a library of branded content by sending requests for consent to brand owners 651. The owner may be a corporate or other entity that owns the brand, or it may be a person who is associated with such an entity and who has authority to grant the system permission to use the brand or branded content, or to specify brand items for which consent is granted subject to various optional descriptions already described above. If consent is received from the owner within the threshold period of time 653, then the system may include the brand or branded content from the library and create branded content containing a trademark and/or message content that has been approved by the owner 655. If consent is not received from the owner within a threshold period of time 653, then the system may remove or otherwise omit the brand or branded content from the library 657. The term "omitting" does not necessarily mean that an item is deleted from the library, but at a minimum it means that the omitted brand item is no longer available for use in training actions subject to some optional restrictions or in general. This can help ensure that branded content has been pre-approved, and that the brand owner has agreed to the particular use and provided any restrictions that may apply to the use.

Figure 7:
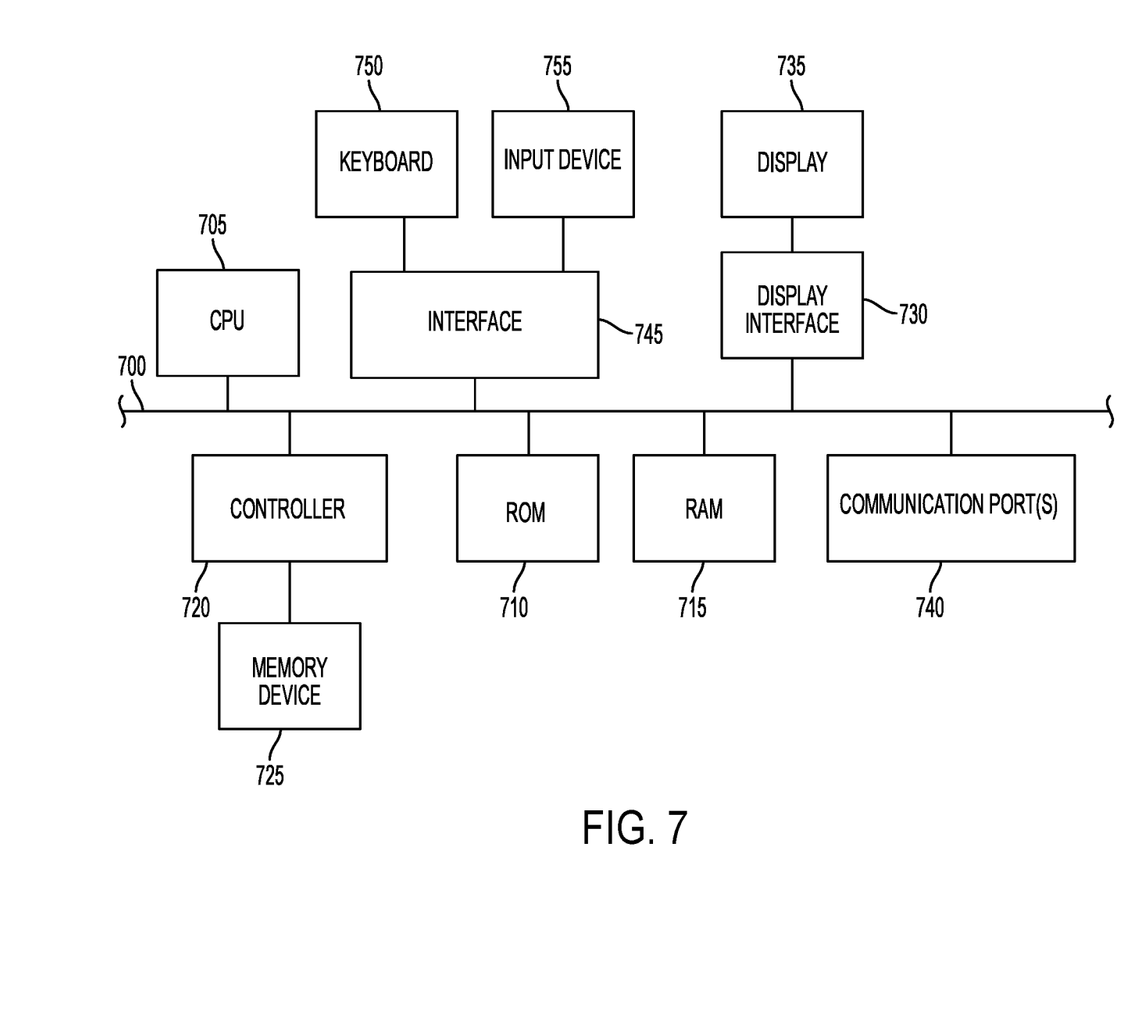
FIG. 7 is a block diagram of certain hardware that an electronic device may include.

FIG. 7 depicts an example of internal hardware that may be used to contain or implement the various computer processes and systems as discussed above. For example, any of the user electronic devices, servers, or computing devices discussed above may include some or all of the hardware architecture illustrated in FIG. 7. An electrical bus 700 serves as an information highway interconnecting the other illustrated components of the hardware. CPU 705 is a central processing unit of the system, performing calculations and logic operations required to execute a program. CPU 705, alone or in conjunction with one or more of the other elements disclosed in FIG. 7, is a processing device, computing device or processor as such terms are used within this disclosure. Read only memory (ROM) 710 and random access memory (RAM) 715 constitute examples of memory devices.

A controller 720 interfaces with one or more optional memory devices 725 that service as data storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

While specific embodiments of the invention have been described in detail, it should be appreciated by those skilled in the art that various modifications and alternations and applications could be developed in light of the overall teachings of the disclosure. Accordingly, the particular arrangements, systems, devices, and methods disclosed are meant to be illustrative only and not limiting as to the scope of the invention.

The invention claimed is:

1. A method of providing cybersecurity training to a user of an electronic device, comprising:
    maintaining, in a data storage device, a library of brand items;
    maintaining, in a data storage device, a library of cybersecurity training actions, wherein each cybersecurity training action comprises a lure or a cybersecurity training intervention; and
    by a policy manager system:
        generating a query to the library of cybersecurity training actions,
        in response to the query, retrieving a template for a cybersecurity training action from the library of cybersecurity training actions,
        select, from the library of brand items, at least one brand item that is available for use in the template for the cybersecurity training action,
        automatically modifying the retrieved template for the cybersecurity training action to include a brand or branded content that corresponds to the selected at least one brand item by including the brand or branded content in one or more elements of the template for the cybersecurity training action, and
        causing the cybersecurity training action according to the modified template instantiated with the branded content to be sent to a second electronic device.

2. The method of claim 1, further comprising, by the policy manager system before automatically modifying the retrieved template for the cybersecurity training action to include the branded content:
    causing a first electronic device to output an administrator interface;
    presenting the template for the cybersecurity training action to an administrator via the administrator interface; and
    receiving, via the administrator interface, an administrator selection of the selected at least one brand item.

3. The method of claim 1, further comprising, by the policy manager system before automatically modifying the retrieved template for the cybersecurity training action to include the branded content:
    causing a first electronic device to output an administrator interface; and
    receiving, via the administrator interface, a selection of a category;
    wherein generating the query to the library of cybersecurity training actions comprises querying the library of cybersecurity training actions for a cybersecurity training action in the selected category.

4. The method of claim 1, further comprising, by the policy manager system before automatically modifying the retrieved template for the cybersecurity training action to include the branded content:
    causing a first electronic device to output an administrator interface;

receiving, via the administrator interface, a selection of a user to be trained; and accessing profile data about the user to be trained;

wherein generating the query to the library of cybersecurity training actions comprises querying the library for a template for a cybersecurity training action that corresponds to the profile data.

5. The method of claim 4, wherein accessing the profile data and querying the library for a template for a cybersecurity training action that corresponds to the profile data comprises:

determining that the user is a new employee and querying the library for a template for a new employee cybersecurity training action; or determining that the user recently infected a computing device with malware from a USB device and querying the library for a template for a safe USB handling cybersecurity training action.

6. The method of claim 1, further comprising, by the policy manager system:

monitoring a user response or lack thereof to the cybersecurity training action that was sent to the second electronic device; and delivering a follow-up cybersecurity training intervention to the second electronic device.

7. The method of claim 1, wherein:

the cybersecurity training action that is sent to the second electronic device comprises a lure;

the template comprises a fake phishing email template comprising a prompt that is configured to prompt a user of the second device to click a hyperlink that, when actuated, causes an application of the second electronic device to access a particular URL; and the lure is associated with a cybersecurity training intervention warning a user to inspect a URL of the link prior to clicking the link.

8. The method of claim 7 further comprising, by the policy manager system based on a response of the user of the second electronic device, either:

presenting the user of the second electronic device with an additional cybersecurity training action corresponding to the training intervention template; or presenting the user of the second electronic device with a positive cybersecurity communication.

9. The method of claim 1, wherein:

the cybersecurity training action that is sent to the second electronic device comprises a lure; and the template comprises a prompt that is configured to prompt a user of the second device to download a mock malicious mobile app.

10. The method of claim 9 further comprising, by the policy manager system based on a response of the user of the second electronic device, either:

presenting the user of the second electronic device with an additional cybersecurity training intervention; or presenting the user of the second electronic device with a positive cybersecurity communication.

11. The method of claim 1, wherein the template comprises a change your password phishing email that can be customized with the brand or branded content.

12. The method of claim 1, wherein causing the cybersecurity training action to be sent to the second electronic device comprises causing the cybersecurity training action to be delivered via a lure that is a short-range communication device containing instructions that are configured to, when read by the second electronic device, cause the second electronic device to be directed to a mock malicious website or service, or to initiate a download of mock malware.

13. The method of claim 1, wherein:

the cybersecurity training action that is sent to the second electronic device comprises a lure; and the lure comprises a mock malicious memory device containing an executable file that will activate if inserted into the first electronic device.

14. The method of claim 1, wherein:

the cybersecurity training action that is sent to the second electronic device comprises a lure; and the lure comprises a barcode that, when scanned by the first electronic device, will cause the first electronic device to be directed to a mock malicious website or service, or to initiate a download of mock malware.

15. The method of claim 1, wherein causing the cybersecurity training action to be sent to the second electronic device comprises causing the cybersecurity training action to be delivered via a mock malicious Wi-Fi access point that lures a user of second electronic device to connect the second electronic device to the Wi-Fi access point.

16. The method of claim 1, wherein:

the library of brand items, also comprises, for at least some of the brand items in the library, information indicating whether the brand items has been authorized for use in one or more cybersecurity training actions by the owner of the brand item; and selecting the brand item that is available for use in the cybersecurity action comprises selecting a brand item that has been authorized for use in the cybersecurity training actions by the owner of the brand item.

17. A cybersecurity training system, comprising:

a processor;

a data storage device portion that stores a library of brand items;

a data storage device portion that stores instructions for a library of cybersecurity training actions, wherein each cybersecurity training action comprises a lure or a cybersecurity training intervention; and a data storage device portion containing programming instructions that are configured to instruct the processor to implement a policy manager system by:

generating a query to the library of cybersecurity training actions, in response to the query, retrieving a template for a cybersecurity training action from the library of cybersecurity training actions, selecting, from the library of brand items, at least one brand item that is available for use in the template for the cybersecurity training action, automatically modifying the retrieved template for the cybersecurity training action to include a brand or branded content that corresponds to the selected at least one brand item by including the brand or branded content in one or more elements of the template for the cybersecurity training action, and causing the cybersecurity training action according to the modified template instantiated with the branded content to be sent to a second electronic device.

18. The system of claim 17, further comprising additional programming instructions that are configured to cause the policy manager system to, before automatically modifying the retrieved template for the cybersecurity training action to include the branded content:

cause a first electronic device to output an administrator interface;

present the template for the cybersecurity training action corresponding to the retrieved template to an administrator via the administrator interface; and receive, via the administrator interface, an administrator selection of the selected at least one brand item.

19. The system of claim 17, further comprising additional programming instructions that are configured to cause the policy manager system to, before automatically modifying the retrieved template for the cybersecurity training action to include the branded content:

cause a first electronic device to output an administrator interface; and receive, via the administrator interface, a selection of a category;

wherein the instructions to generate the query to the library of cybersecurity training actions comprises instructions to query the library cybersecurity training actions for a cybersecurity training action in the selected category.

20. The system of claim 17, further comprising additional programming instructions that are configured to cause the policy manager system to, before automatically modifying the retrieved template for the cybersecurity training action to include the branded content:

cause a first electronic device to output an administrator interface;

receive, via the administrator interface, a selection of a user to be trained; and access profile data about the user to be trained;

wherein the instructions to generate the query to the library of cybersecurity training actions comprises instructions to query the library for a template for a cybersecurity training action that corresponds to the profile data.

21. The system of claim 20, wherein the instructions to access the profile data and query the library for a template for a cybersecurity training action that corresponds to the profile data comprise instructions to:

determine that the user is a new employee and querying the library for a template for a new employee cybersecurity training action; or determine that the user recently infected a computing device with malware from a USB device and querying the library for a template for a safe USB handling cybersecurity training action.

22. The system of claim 17, further comprising additional instructions that are configured to cause the policy manager system to:

monitor a user response or lack thereof to the cybersecurity training action that was sent to the second electronic device; and deliver a follow-up cybersecurity training intervention to the second electronic device.

23. The system of claim 17, wherein:

the cybersecurity training action that is sent to the second electronic device comprises a lure;

the template comprises a fake phishing email template comprising a prompt that is configured to prompt a user of the second device to click a hyperlink that, when actuated, causes an application of the second electronic device to access a particular URL; and the lure is associated with a cybersecurity training intervention warning a user to inspect a URL of the link prior to clicking the link.

24. The system of claim 17, wherein:

the cybersecurity training action that is sent to the second electronic device comprises a lure; and the template comprises a prompt that is configured to prompt a user of the second device to download a mock malicious mobile app.

25. The system of claim 17, wherein the template comprises a change your password phishing email that can be customized with the brand or branded content.

26. The system of claim 17, wherein the instructions to cause the cybersecurity training action to be sent to the second electronic device comprise instructions to cause the cybersecurity training action to be delivered via a lure that is a short-range communication device containing instructions that are configured to, when read by the second electronic device, cause the second electronic device to be directed to a mock malicious website or service, or to initiate a download of mock malware.

27. The system of claim 17, wherein:

the cybersecurity training action that is sent to the second electronic device comprises a lure; and the lure comprises a mock malicious memory device containing an executable file that will activate if inserted into the first electronic device.

28. The system of claim 17, wherein:

the cybersecurity training action that is sent to the second electronic device comprises a lure; and the lure comprises a barcode that, when scanned by the first electronic device, will cause the first electronic device to be directed to a mock malicious website or service, or to initiate a download of mock malware.

29. The system of claim 17, wherein the instructions to cause the cybersecurity training action to be sent to the second electronic device comprise instructions to cause the cybersecurity training action to be delivered via a mock malicious Wi-Fi access point that lures a user of second electronic device to connect the second electronic device to the Wi-Fi access point.

30. The system of claim 17, wherein:

the library of brand items also comprises, for at least some of the brand items in the library, information indicating whether the brand item has been authorized for use in one or more cybersecurity training actions by the owner of the brand item; and the instructions to select at least one brand item that is available for use in the cybersecurity action comprise instructions to select a brand item that has been authorized for use in the cybersecurity training actions by the owner of the brand item.

* * * * *